UNITED STATES PATENT OFFICE.

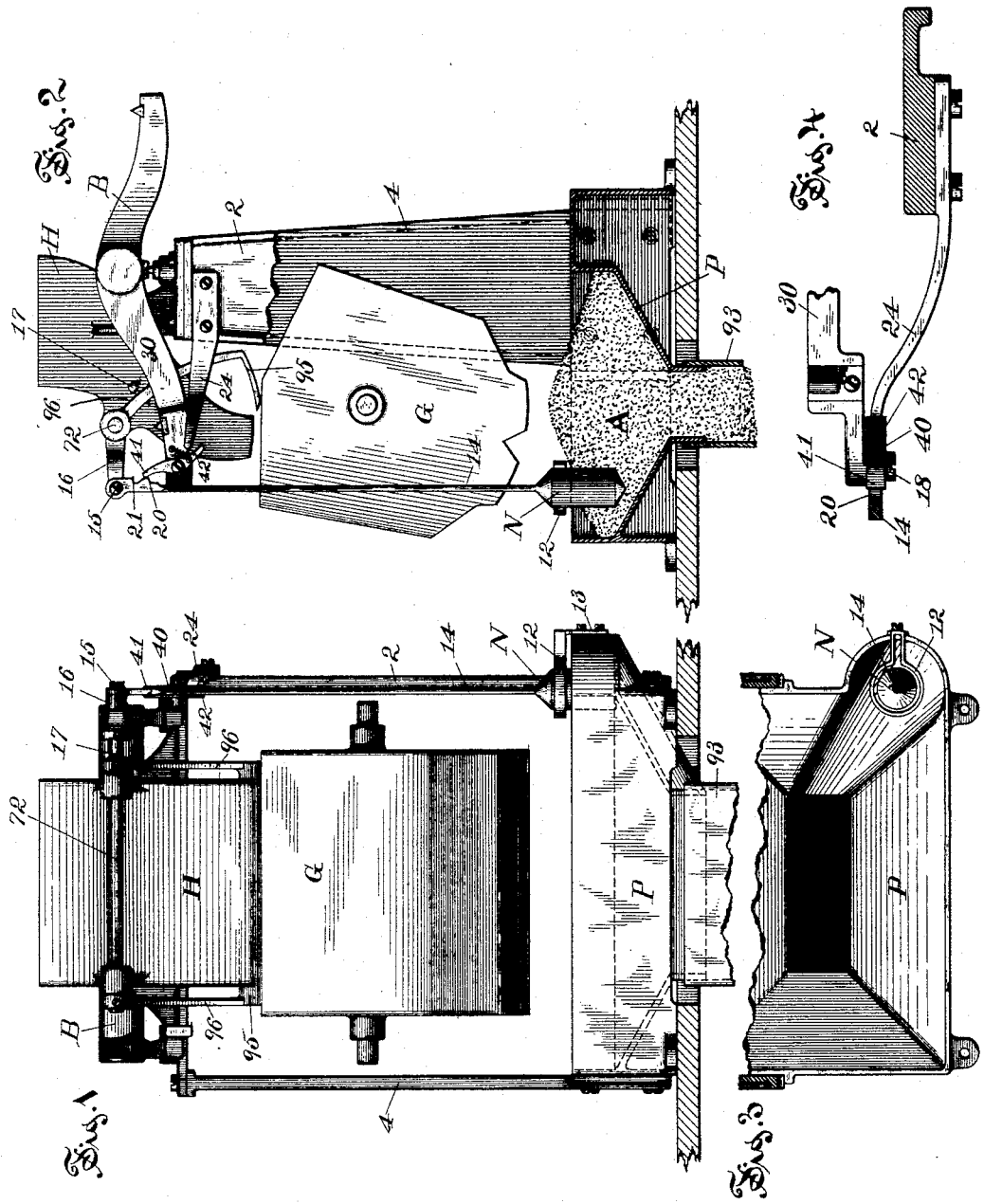

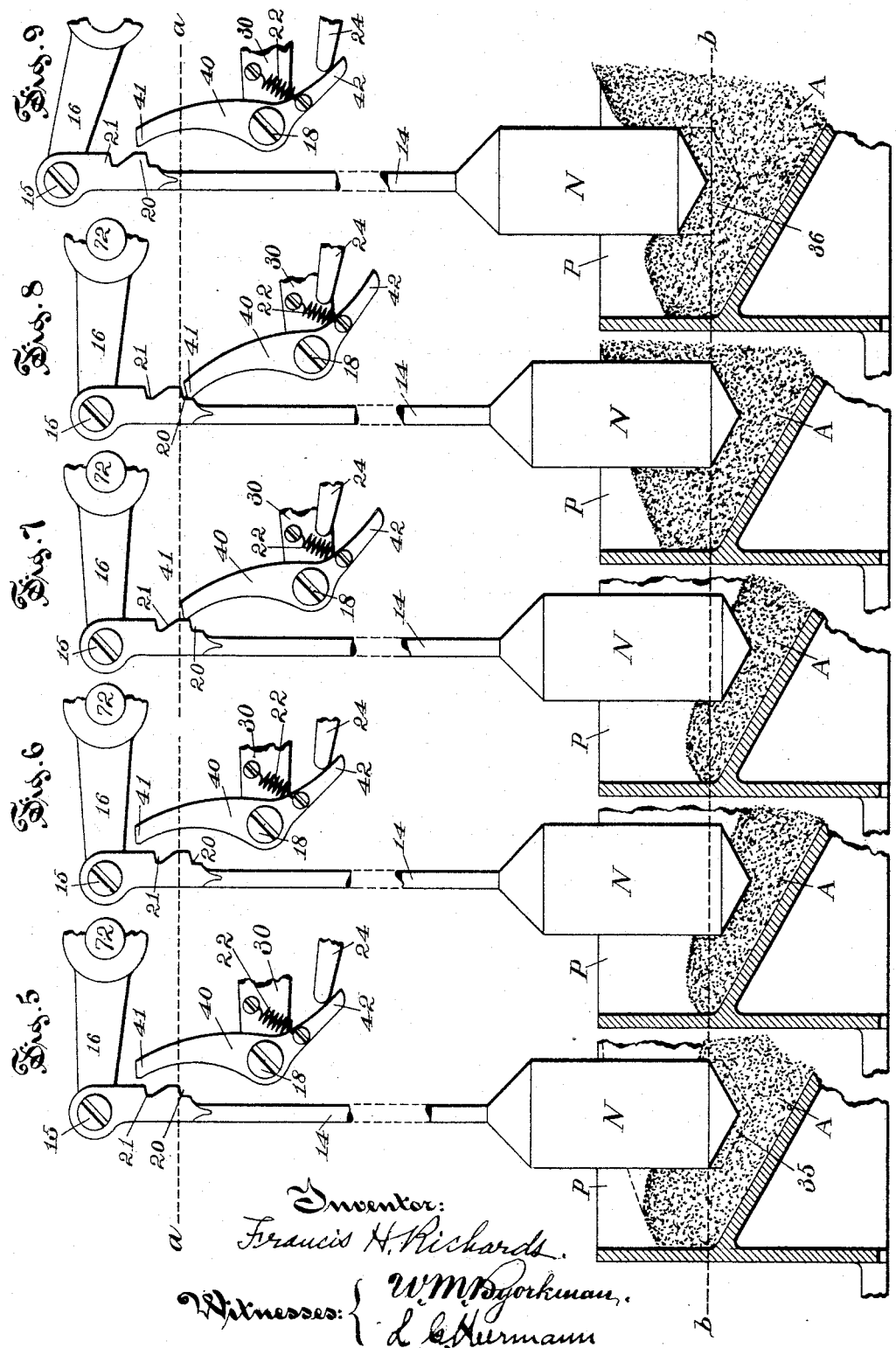

FRANCIS H. RICHARDS, OF HARTFORD, CONNECTICUT.

REGULATOR FOR GRAIN-SCALES.

SPECIFICATION forming part of Letters Patent No. 410,117, dated August 27, 1889.

Application filed January 17, 1889. Serial No. 296,676. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Regulators for Grain-Scales, of which the following is a specification.

This invention relates to regulators for automatically controlling the operation of automatic grain-weighing machines, the object being to regulate the delivery of grain to the receiving-hopper so that this hopper may be always properly supplied.

To this end the invention consists in the improvements hereinafter more fully set forth.

In the drawings accompanying and forming a part of this specification, Figure 1 is a front elevation of portions of a grain-scale, together with apparatus embodying my present improvements. Fig. 2 is a side elevation, partially in section, of the same. Fig. 3 is a plan view of a portion of the grain-receiving hopper and showing certain details. Fig. 4 is a plan view of certain operative details, hereinafter described. Figs. 5, 6, 7, 8, and 9 are similar diagrammatic views, drawn on a larger scale and illustrating the mode of operation of the regulator apparatus.

Similar characters designate like parts in all the figures.

My improved regulator apparatus is adapted to be used in connection with grain-scales generally; but I have shown it in the drawings applied to the "Hill" grain-scale in the improved form thereof shown in the prior application of C. H. Cooley, Serial No. 262,850. That improved scale comprises among other things the uprights 2 and 4, the grain-bucket G, the supply hopper or chute H, mounted on the said uprights, a scale-beam similar to the one shown herein, the valve-shaft 72, the regulator-valve 95, carried by arms 96, extending from said shaft, and means (not shown herein) for supporting and operating the grain-bucket G, including cut-off valves and valve-operating devices for properly supplying grain to said bucket. All of these said parts are or may be, with certain minor exceptions, the same in my present improvements as in said prior application.

According to my present invention the grain-receiving hopper is a fixed part and not vertically movable. This hopper P, I preferably make of a box-shaped form, substantially as shown, to serve as a frame-work for supporting the uprights 2 and 4, the mass of grain in said hopper being designated by A. A pipe 93 may extend therefrom to some grain-receiving machine. (Not shown.) In practice the flow of grain down into said pipe is less than the normal quantity discharged by the bucket G, which also discharges intermittently.

To regulate and control the action of the machine, the valve 95 is provided, and to properly actuate that valve to effect such regulation I employ the following mechanism: The vertically-movable plunger N is located to stand in the grain-receiving hopper, substantially as shown, being guided in practice by some suitable guide—as, for instance, the loop 12, which may be affixed to the frame at 13 by screws or otherwise. A connection 14, extending upward from said plunger, connects at 15 to the arm 16 of the valve-shaft 72. Some suitable stop, as 17, serves to limit the backward movement of the valve and the downward movement of the plunger, which plunger is shown in its lowest position in Figs. 6 and 7. The upper end of the said connection is furnished with two catches 20 21, whereby the plunger and arm 16 may be lifted by a pawl carried by the scale-beam. One of the arms 30 of the scale-beam B has pivoted thereto at 18 a pawl 40, whose upper end 41 is adapted to engage with said catches 20 and 21, which pawl may be normally held in engagement with said catches by the tension-spring 22, acting between said parts, as shown. A fixed stop 24 is provided to strike the arm 42 of pawl 40, and throw this out of engagement with said catches on the upstroke of the beam, substantially as shown. The object of this disengagement is to leave the plunger free to descend with the outflowing grain until arrested by the stop 17.

The dotted lines *a a* and *b b*, extending across Figs. 5 to 9, inclusive, serve as reference-lines by which to observe the relative positions of the several operative details in said figures.

In Fig. 5 the arm 30 stands in its highest position. The pawl 40 is thrown out of engagement with the catches 20 and 21, and the plunger N, now at its highest position, stands in the mass of grain A, ready to descend therewith. In Fig. 6 said mass of grain is shown somewhat lowered, the plunger N having descended therewith, as indicated by the line $b$ $b$, and the catches 20 21, as indicated by the line $a$ $a$, the arm 30, and the pawl 40 being in their previous positions. In Fig. 7 the grain A, plunger N, and catches 20 and 21 remain as before; but the arm 30 has descended to its lowest position and the pawl 40 has swung against the catch 20 of the rod 14. If now the arm 30 is carried up to its first position, as it is immediately after the bucket G discharges its load, the pawl 40 engages catch 21, lifts the plunger to its position in Fig. 5, and is then disengaged by stop 24, as there shown. In the meantime, before such disengagement, the grain flows under plunger N, as indicated at 35, Fig. 5, and thus temporarily sustains the weight thereof. This series of steps constitutes the normal operation of the apparatus so long as the grain A flows out through pipe 93 as fast as delivered by the bucket G; but should the mass of grain A not flow downward, as set forth, the next position following that shown in Fig. 5 will be the position shown in Fig. 8. Here the pawl 40 on the downward movement of arm 30 drops under notch 20, and on the upward movement of said arm, as in Fig. 9, it lifts the plunger N to its highest position here shown, thus lifting arm 16 and swinging the regulator-valve under the chute H, and thereby shutting off the supply of grain and stopping the machine. In this case, as before, the grain runs underneath the ascending plunger, as indicated at 36, Fig. 9, and sustains the same until the whole mass is lowered by the outflow through the pipe 93. As the grain is thus lowered in the hopper P, the weight of the plunger-rod 14 and arm 16 acts to open valve 95 and again start the machine.

Having thus described my invention, I claim—

1. In a regulator for grain-scales, the combination, with the regulator-valve and with the reciprocating beam, of a grain-receiving hopper, a plunger located in said hopper and operatively connected with said valve, catches, substantially as described, on said connections, and a pawl carried by said beam and constructed to engage said catches, all substantially as described.

2. In a regulator for grain-scales, the combination, with the regulator-valve, of the plunger N, connections, substantially as described, connecting said valve and plunger and having catches substantially as described, the stop limiting the backward motion of said valve and the arm 30, carrying pawl 40, substantially as described.

3. In a regulator for grain-scales, the combination, with the plunger, the valve, and connections, substantially as described, of the catches 20 and 21, the arm carrying the pawl engaging with said catches, and a stop disengaging said pawl on the upstroke of the arm, all substantially as described.

FRANCIS H. RICHARDS.

Witnesses:
HENRY L. RECKARD,
LEWIS C. HEERMANN.